United States Patent
Kouno

(10) Patent No.: US 7,855,750 B2
(45) Date of Patent: Dec. 21, 2010

(54) OPTICAL FILTER AND OPTICAL DEVICE WITH FILTER HOLDING MEMBER FOR AN IMAGE CAPTURING DEVICE

(75) Inventor: Yousuke Kouno, Yokohama (JP)

(73) Assignee: Nikon Corporation, Tokyo (JP)

( * ) Notice: Subject to any disclaimer, the term of this patent is extended or adjusted under 35 U.S.C. 154(b) by 110 days.

(21) Appl. No.: 12/076,926

(22) Filed: Mar. 25, 2008

(65) Prior Publication Data
US 2008/0179508 A1    Jul. 31, 2008

Related U.S. Application Data

(63) Continuation of application No. 10/919,436, filed on Aug. 17, 2004, now abandoned, which is a continuation of application No. 09/501,600, filed on Feb. 10, 2000, now abandoned.

(30) Foreign Application Priority Data

Feb. 25, 1999 (JP) ................. 11-047744

(51) Int. Cl.
H04N 5/222 (2006.01)
(52) U.S. Cl. ....................... 348/374; 348/342
(58) Field of Classification Search ................. 348/342, 348/374, 294, 335, 373
See application file for complete search history.

(56) References Cited

U.S. PATENT DOCUMENTS

| | | | | |
|---|---|---|---|---|
| 4,302,078 A | * | 11/1981 | Stravitz | 359/892 |
| 5,548,373 A | * | 8/1996 | Ueda | 355/55 |
| 6,011,661 A | | 1/2000 | Weng | |
| 6,069,651 A | * | 5/2000 | Tsuyuki et al. | 348/75 |
| 6,078,442 A | | 6/2000 | Tada et al. | |
| 6,088,162 A | | 7/2000 | Someno | |

FOREIGN PATENT DOCUMENTS

| | | |
|---|---|---|
| EP | 0608169 | 7/1994 |
| JP | A-57-192084 | 11/1982 |
| JP | A-2-184071 | 7/1990 |
| JP | A-5-19386 | 1/1993 |
| JP | U-7-14402 | 3/1995 |
| JP | A-9-130683 | 5/1997 |
| JP | A-9-135010 | 5/1997 |
| JP | A-10-54960 | 2/1998 |

\* cited by examiner

*Primary Examiner*—Gevell Selby
(74) *Attorney, Agent, or Firm*—Oliff & Berridge, PLC

(57) ABSTRACT

An optical filter that is provided at an optical path between a photoelectric conversion device which converts a subject image formed at a light-receiving surface thereof to an electrical signal and an optical system which forms the subject image with a light flux from the subject at the photoelectric conversion device, to filter the light flux, includes a stage formed at, at least, a portion of an external circumference of the optical filter.

5 Claims, 9 Drawing Sheets

OPTICAL FILTER AND OPTICAL DEVICE WITH FILTER HOLDING MEMBER FOR AN IMAGE CAPTURING DEVICE

INCORPORATION BY REFERENCE

This is a Continuation of application Ser. No. 10/919,436, filed Aug. 17, 2004 which is a Continuation of application Ser. No. 09/501,600 filed Feb. 10, 2000 (now abandoned). The entire disclosures of the prior applications are hereby incorporated by reference herein in their entireties.

The disclosure of the following priority application is herein incorporated by reference: Japanese Patent Application No. 11-47744, filed Feb. 25, 1999.

BACKGROUND

The present invention relates to an optical filter (plate) provided at the front surface of a solid image-capturing element (e.g., a CCD) or the like and an optical device mounted with this optical filter.

A CCD employed in a digital camera or the like converts a two-dimensional optical image having specific spatial frequency characteristics to an electrical signal by sampling it in time sequence. If the spatial frequency of the optical image is equal to or less than the Nyquist frequency (a frequency equal to ½ of the sampling clock), alias signal, moire and the like are not generated. For this reason, it is necessary to restrict the spatial frequency of an optical image input to the CCD to be equal to or less than the Nyquist frequency. In addition, it is necessary to cut infrared light to prevent it from affecting the characteristics of the CCD. Thus, an optical filter plate achieved by laminating a birefringent plate (an optical low-pass filter), an infrared-cutting filter plate and the like must be provided at the front surface of the CCD.

An optical filter in the prior art is formed in a simple parallelepiped shape, since the optical filter, which must undergo the cutting process, cannot be formed in a circular shape and the orientation of the birefringent plate needs to be regulated. For instance, an external shape achieved by providing two birefringent plates enclosing a ¼λ plate and an infrared-cutting filter plate, which is constituted of the individual plates formed in shapes identical to one another, is bound to be a rectangular parallelepiped.

Since a sufficient space for accommodating a holding member is required along the direction of the optical axis to hold such a rectangular parallelepiped optical filter plate, there is a problem in that it is difficult to provide the optical filter plate within the limited space. For instance, rigorous dimensional restrictions are imposed along the direction of the optical axis if the optical filter is to be placed between an optical lens and the solid image-capturing element or between a mechanical shutter and the solid image-capturing element, which greatly reduces the degree of freedom afforded in design. In addition, while it is conceivable to use glue to paste the optical filter plate to the protective glass of the solid image-capturing element without employing any holding member, it is difficult to implement quality control to ensure that there is no dust or air bubbles present when the optical filter is being laminated, and there is a problem in that if dust or the like is discovered after the optical filter is glued, the problem cannot be corrected. In particular, this will result in a serious increase in the production costs when a high-density pixel solid image-capturing element with a high unit price is used.

SUMMARY

An object of the present invention is to provide an optical filter that can be mounted by efficiently utilizing the limited space at the front surface of a solid image-capturing element or the like at low cost and an optical device provided with the optical filter.

In order to attain the above object, an optical filter according to the present invention that is provided at an optical path between a photoelectric conversion device which converts a subject image formed at a light-receiving surface thereof to an electrical signal and an optical system which forms the subject image with a light flux from the subject at the photoelectric conversion device, to filter the light flux, comprises: a stage formed at, at least, a portion of an external circumference of the optical filter.

In this optical filter, it is preferred that: a plurality of filter layers are laminated along a direction of an optical axis of the light flux that passes through; and the stage is formed by varying a size of a surface of at least one filter layer along a direction perpendicular to the optical axis of the passing light flux from a size of a surface of another filter layer along a direction perpendicular to the optical axis.

In the above optical filters, it is preferred that the stage is utilized to hold the optical filter.

An optical device according to the present invention comprises: a photoelectric conversion device that converts a subject image formed at a light-receiving surface thereof to an electric signal; an optical system that forms the subject image with a light flux from a subject at the light-receiving surface of the photoelectric conversion device; an optical filter that is provided on an optical path between the photoelectric conversion device and the optical system to filter the light flux; and a holding member that holds the optical filter. And the optical filter comprises a stage formed at, at least, a portion of an external circumference of the optical filter and the stage is utilized to hold the optical filter element with the holding member.

In this optical device, it is preferred that the holding member has a spring property and holds the optical filter by pressing the optical filter either toward the photoelectric conversion device or toward the optical system.

DETAILED DESCRIPTION OF EMBODIMENTS

First Embodiment

Figure 1:
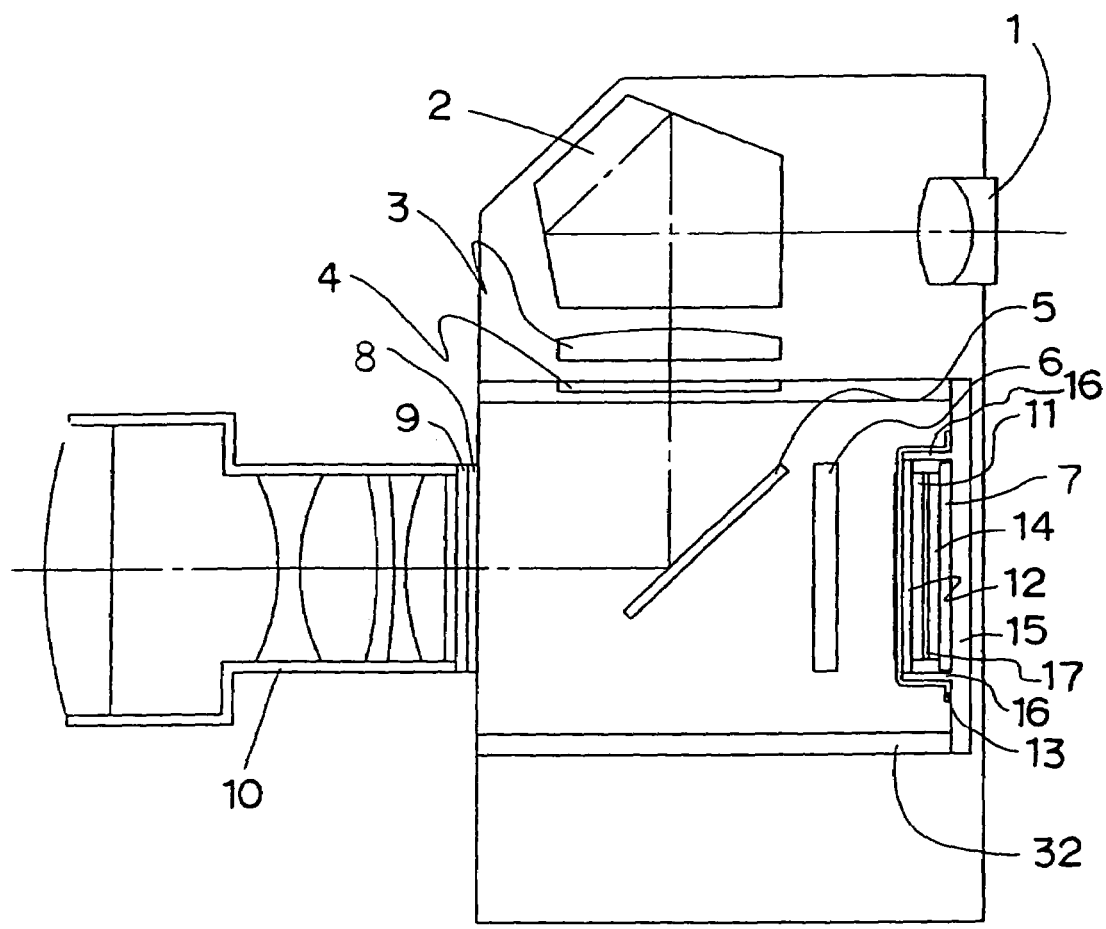
FIG. 1 illustrates the structure of a first embodiment of a digital still camera mounted with the optical filter plate (element) according to the present invention.

FIG. 1 shows the structure assumed in the first embodiment of the digital camera mounted with the optical filter plate (element) according to the present invention. A taking lens 10 is an optical system that forms an image of a light flux (ray) from a subject (not shown) at the light-receiving surface of a solid image-capturing element 7 or at a focus plate 4 via a quick-return mirror 5. A viewfinder optical system, which includes the focus plate 4 with its upper surface constituting a Fresnel condenser and a condenser lens 3 constituted of a plano-convex lens placed above the focus plate 4, is observed by the photographer with an eyepiece lens 1 through a pentaprism 2. In addition, the viewfinder optical system is exchangeable, and the position of the solid image-capturing element 7 and the position of the focus plate 4 are conjugate with each other relative to the taking lens 10. The taking lens 10 is mounted by engaging a lens-side mount 9 with a camera-side mount 8.

A shutter 6 is a focal plane shutter. When a shutter release button (not shown) is pressed by the photographer, a photographic signal is provided to a CPU (not shown), and the shutter 6 starts to operate. The solid image-capturing element, which may be constituted of, for instance, a CCD (charge-coupled device), performs photoelectric conversion on received light to output an electrical image signal. The solid image-capturing element 7 converts light having passed through the taking lens 10 and an optical filter plate 11 to an electrical signal. A solid image-capturing element protective glass 14 is a sealed package provided to protect the light-receiving element at the solid image-capturing element 7. The solid image-capturing element 7 is mounted at a bracket 15 with an adhesive, a glue or the like. The optical filter plate 11, which is provided between the shutter 6 and the solid image-capturing element 7, is to be detailed later.

Figure 2:
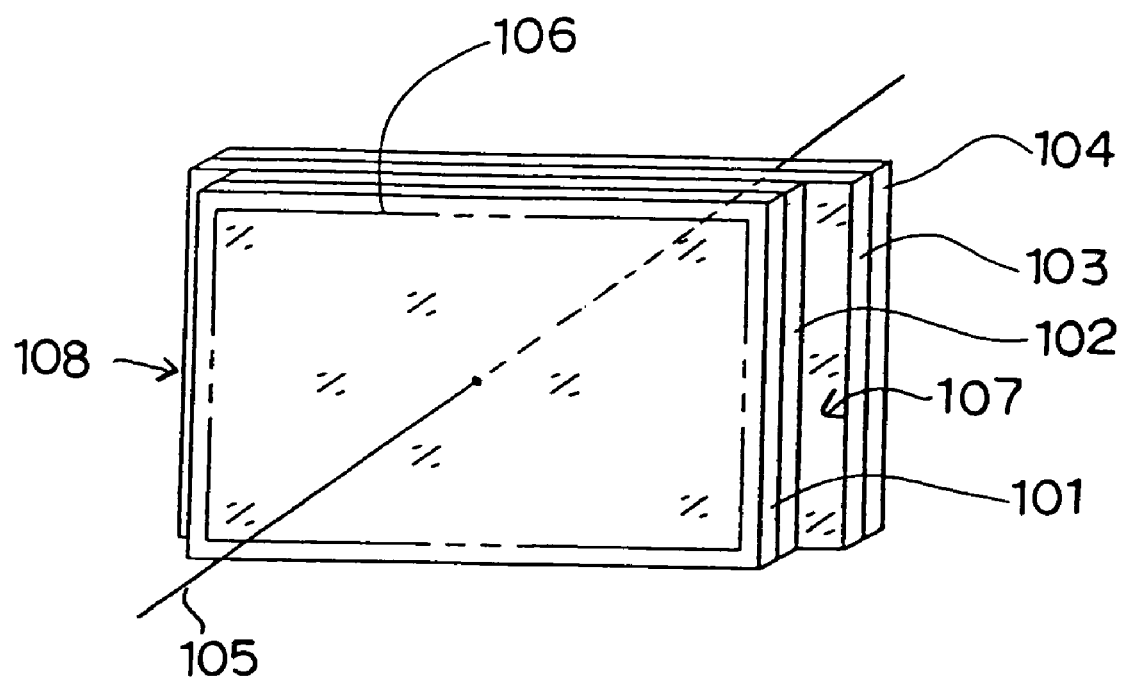
FIG. 2 illustrates the structure assumed in the optical filter plate.

Next, in reference to FIG. 2, the structure assumed by the optical filter plate 11 is explained. The front side in FIG. 2 corresponds to the side on which the taking lens 10 is present in FIG. 1. The optical filter plate 11 is constituted by sequentially pasting together a birefringent plate or a double refraction plate (also referred to as an optical low-pass filter or a spatial frequency filter plate) 101, an infrared-cutting filter plate 102, a ¼λ plate 103 and a birefringent plate 104 in the order in which they are listed above from the side on which the taking lens 10 is present. In other words, the individual layers (plates) are laminated one on top of another along the direction of an optical axis 105.

The birefringent plates 101 and 104, which are provided to separate the light flux passing through them into an ordinary ray and an extraordinary ray, are constituted of quartz crystal or $LiNbO_3$. Since the thickness of a birefringent plate constituted of $LiNbO_3$ along the direction of the optical axis can be reduced to approximately ⅓ the thickness of a birefringent plate constituted of quartz crystal, $LiNbO_3$ is used to constitute the birefringent plates in the embodiment. The infrared-cutting filter plate 102, which cuts infrared light to allow only visible light to be received at the solid image-capturing element 7 constituted of a CCD or the like, is constituted by evaporating or coating an infrared-cutting member on a glass plate. The ¼λ plate, which generates an optical path difference of a ¼ wavelength between linearly polarized light beams oscillating in directions perpendicular to each other to achieve circularly polarized light, is constituted of quartz crystal. The entire thickness of the optical filter plate 11 is approximately 1.5 mm.

Figure 9:
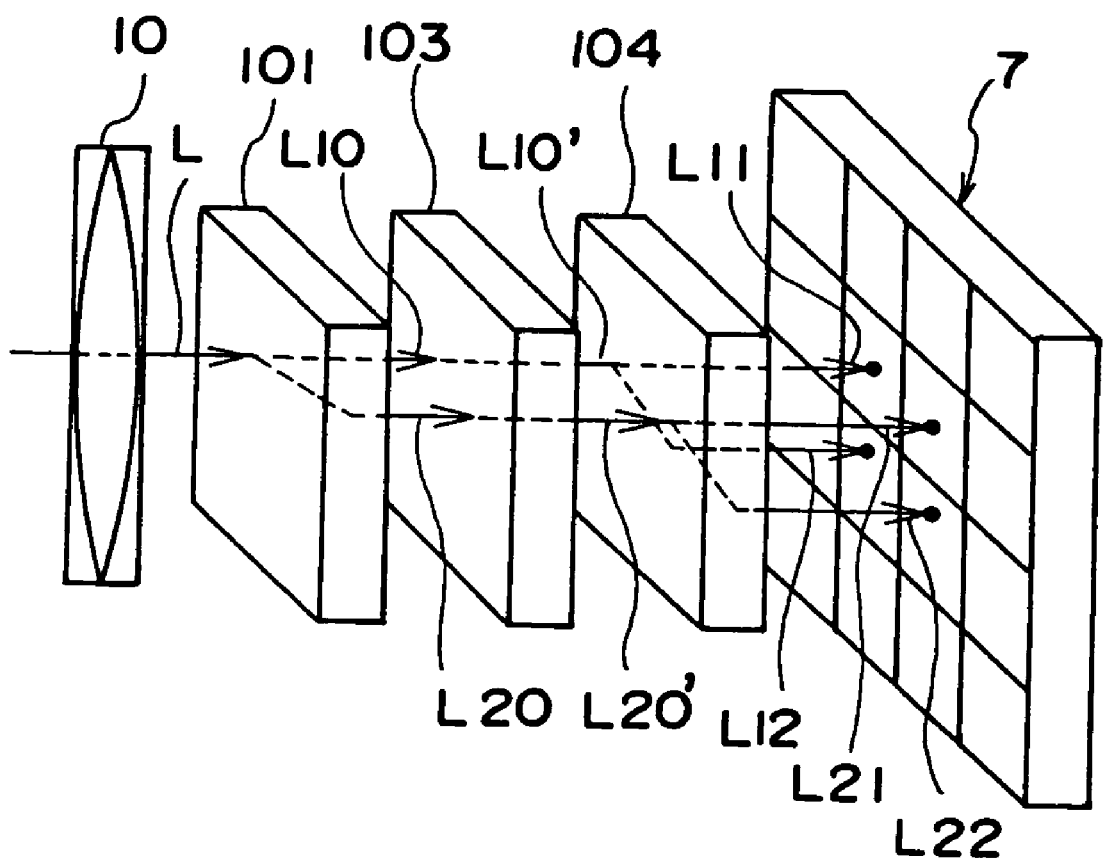
FIG. 9 illustrates the operating principle of the optical filter plate.

The following is an explanation of the operating principle of the optical filter plate 11, given in reference to FIG. 9. A photographic light flux L, which is natural light, having been transmitted through the taking lens 10 enters the first birefringent plate 101 where it is separated into ordinary light L10 and extraordinary light L20 achieving a light intensity ratio of 1:1 to proceed through two separate light paths and form a double image. The infrared light components in the ordinary light L10 and the extraordinary light L20 are cut by the infrared-cutting filter plate 102 (not shown in FIG. 9) and then the ordinary light L10 and the extraordinary light L20 enter the ¼λ plate 103 where they become converted to two circularly polarized light rays, i.e., circularly polarized light L10' and circularly polarized light L20' with their phases having a phase difference of 90° between them. Then the circularly polarized light L11 and the circularly polarized light L20' enter the second birefringent plate 104 where the circularly polarized light L10' becomes separated into ordinary light L11 and extraordinary light L12 having intensity levels equal to each other and likewise, the circularly polarized light L20' becomes separated into ordinary light L21 and extraordinary light L22 having intensity levels equal to each other. Thus, a quadruple image is formed on the solid image-capturing element 7. Since the birefringent plates 101 and 104 are combined with each other so that the directions in which an image becomes displaced through birefringence achieved at the individual birefringent plates are offset from each other by 90°, the quadruple image on the solid image-capturing element 7 forms a square with an equal intensity achieved at the individual points. In other words, the birefringent plates 101 and 104 fulfill a function as so-called optical low pass filters that allow a specific spatial frequency to pass.

It is to be noted that the ¼λ plate 103 needs to be provided between the two birefringent plates 101 and 104 as explained above and that since the infrared-cutting filter plate 102 becomes opaque upon contact with air, it is standard practice to enclose the infrared-cutting filter plate 102 with other substrates to ensure that its surface does not come in contact with air. While the infrared-cutting filter plate 102 is constituted by evaporating a multi-layer film achieving an infrared-cutting effect at the surface of a glass substrate, it may be constituted by providing a similar multi-layer film at the surface of a substrate constituted of, for instance, $LiNbO_3$, instead. In such a case, the thickness of the infrared-cutting filter plate 102 can be further reduced.

The explanation proceeds in reference to FIG. 2. The two-dot chain line 106 in FIG. 2 indicates an image-capturing range. While the dimensions of the birefringent plates 101 and 104, the infrared-cutting filter plate 102 and the ¼λ plate 103 are the same along the vertical direction, their dimensions along the horizontal direction are different. The dimensions of the birefringent plate 101 and the infrared-cutting filter plate 102 in the horizontal direction are set equal to each other, the dimensions of the ¼λ plate 103 and the birefringent plate 104 in the horizontal direction are set equal to each other and the dimensions of the birefringent plates 101 and the infrared-cutting filter plate 102 are set slightly smaller than the dimensions on the ¼λ plate 103 and the birefringent plate 104 to create stages 107 and 108. Since the infrared-cutting filter plate 102 is usually weaker and more expensive than the ¼λ plate 103, a cost reduction is achieved while assuring a sufficient degree of strength by adopting the structure shown in FIG. 2.

Figure 3:
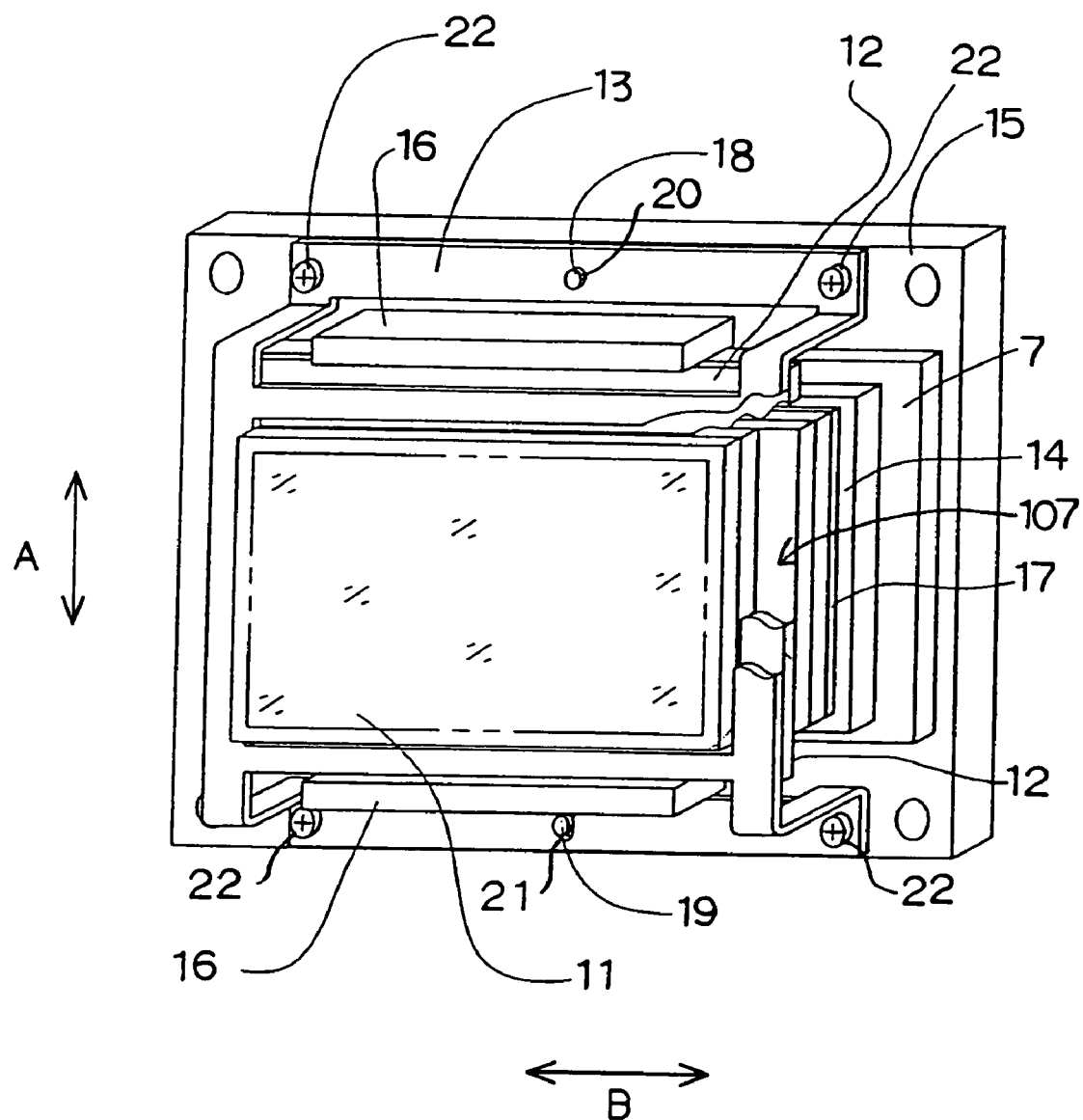
FIG. 3 illustrates how the optical filter plate is mounted.

FIG. 3 illustrates how the optical filter plate 11 explained above is mounted. The optical filter plate 11 and the light-receiving surface of the solid image-capturing element 7 are positioned along the vertical direction (indicated by the arrow A) by fitting an adapter 12 having a quadrangular opening at the stages 107 and 108 of the optical filter plate 11. The opening of the adapter 12 is formed to match the dimensions of the birefringent plates 101 and the infrared-cutting filter plate 102, with special care taken to ensure that the gap formed in the vertical direction is minimized while allowing for play and the like needed during the mounting process. Since the bracket 15 at which the solid image-capturing element 7 is mounted is provided with a wall 16 and the position of the adapter 12 is regulated by the wall 16, the position of the optical filter plate 11 along the vertical direction, too, is regulated by the wall 16.

The positioning in the horizontal direction (indicated by the arrow B) is achieved by fitting the inner side of a quadrangular opening of a holder 13 at the stages of the optical filter plate 11 attached with the adapter 12. The opening of the holder 13 is formed to match the dimensions of the birefringent plates 101 and the infrared-cutting filter plate 102 and particular care is taken to ensure that the gap formed in the horizontal direction is minimized while allowing for play and the like needed during the mounting process, to prevent wobbling or rattling of the optical filter plate 11 and the holder 13 in the horizontal direction. The bracket 15 is provided with positioning pins 18 and 19, and by inserting the positioning pins 18 and 19 respectively at holes 20 and 21 formed at the holder 13, the position of the holder 13 is regulated. The holder position along the horizontal direction, in particular, is set with a high degree of accuracy.

Figure 4:
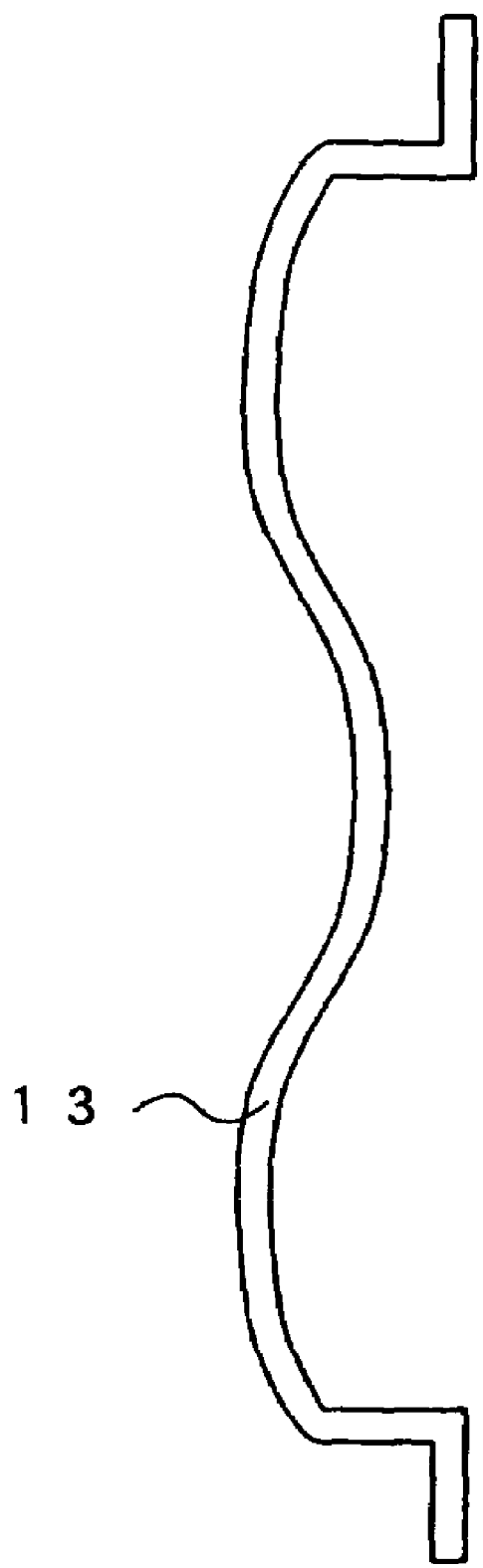
FIG. 4 shows the holder viewed from the right side.

FIG. 4 shows the holder 13 in FIG. 3 viewed from the right side. The holder 13, which is constituted of an elastic sheet metal, is formed in a slightly wavy shape, as shown in FIG. 4. The holder 13 is secured to the bracket 15 by screws 22 at its four corners. During this securing process, with the spring force achieved through the wavy shape of the holder 13, the optical filter plate 11 is secured by the holder 13, which presses it toward the solid image-capturing element 7.

The holder 13, which is formed in a wavy shape and achieves a spring property as explained above, extends slightly in the vertical direction when the screws 22 are tightened. For this reason, the hole 21 is formed in an elongated shape. In addition, since positioning accuracy for the optical filter plate 11 along the vertical direction cannot be achieved by the holder 13, positioning along the vertical direction is implemented by using the adapter 12 as explained earlier in this embodiment.

Since the total of the plate thickness of the adapter 12 and the plate thickness of the holder 13 (the dimensions that are set by taking into consideration the flexure resulting from the spring property) is set smaller than the dimensions of the stages 107 and 108 along the direction of the optical axis in the embodiment, the surface of the holder 13 is not set higher than the surface of the optical filter plate 11 on the side toward the taking lens 10 when the holder 13 is mounted. Thus, the need for the space which would otherwise be required along the direction of the optical axis to accommodate a holding member for mounting the optical filter plate 11 is eliminated, thereby facilitating mounting of the optical filter plate 11 in limited space.

Since the optical filter plate 11 is ultimately secured to the solid image-capturing element 7 by securing the holder 13 with the screws as described above, the screws 22 simply need to be removed for disassembly and cleaning if dust adhering between the solid image-capturing element protective glass 14 and the optical filter plate 11 is spotted during a photographing check performed after the assembly is completed. While dust or air bubbles discovered after laminating the optical filter plate 11 and the solid image-capturing element 7 with glue cannot be removed, they can be removed when the optical filter plate 11 and the solid image-capturing element 7 according to the present invention are adopted to achieve a cost reduction.

A scar-preventing sheet 17 is provided between the optical filter plate 11 and the solid image-capturing element protective glass 14. The scar-preventing sheet 17, which is provided to prevent scaring caused by glass members scratching against each other and occurrence of Newton rings, has a rectangular opening formed over the range in which a light flux enters, i.e., an image-capturing range 106, to ensure that it does not block the light flux entering the solid image-capturing element 7. The scar-preventing sheet 17 is constituted of a polyethylene terephthalate sheet or the like, and its surface is mat finished through a sand-blasting process and is black.

As explained above, the stages 107 and 108 are formed by setting the size of the surfaces of the birefringent plate 101 and the infrared-cutting filter plate 102 perpendicular to the optical axis of the light flux passing through them (the surfaces parallel to the image-capturing plane) along the horizontal direction is set slightly smaller than the size of the corresponding surfaces of the ¼λ plate 103 and the birefringent plate 104 along the horizontal direction. In addition, the holder 13 is fitted at the stages 107 and 108 to apply the spring force of the holder 13 to the stage surfaces perpendicular to the optical axis so that the optical filter plate 11 is pressed toward the solid image-capturing element 7 and is held. Thus, the surface of the holder 13 is not set higher than the surface of the optical filter plate 11 on the side toward the taking lens 10, thereby facilitating mounting of the optical filter plate 11 in limited space. The solid image-capturing element 7 mounted with the optical filter plate 11 in this manner is capable of obtaining a good image by preventing false color signals and moire.

It is to be noted that the total dimensions of the plate thickness of the adapter 12 and the plate thickness of the holder 13 (the dimensions set by taking into consideration the flexure resulting from the spring property) do not always need to be set smaller than the dimensions of the stages 107 and 108 along the direction of the optical axis. Even when the total is not smaller than the dimensions of the stages 107 and 108, the surface of the holder 13 can be lowered in correspondence to the dimensions of the stages and, as a result, sufficient space is secured to achieve the object of the present invention.

Variations of Optical Filter Plate

Figure 5:
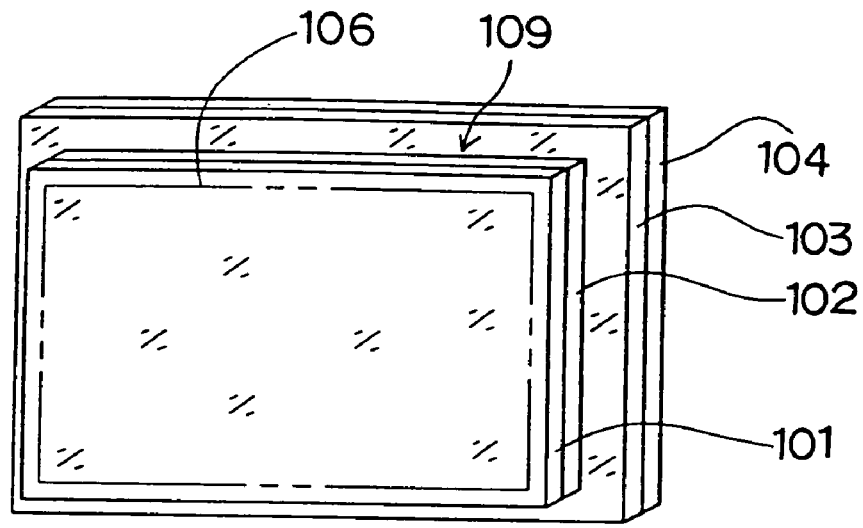
FIGS. 5A and 5B illustrate variations that may be adopted when forming a stage in the optical filter plate.
Figure 5:
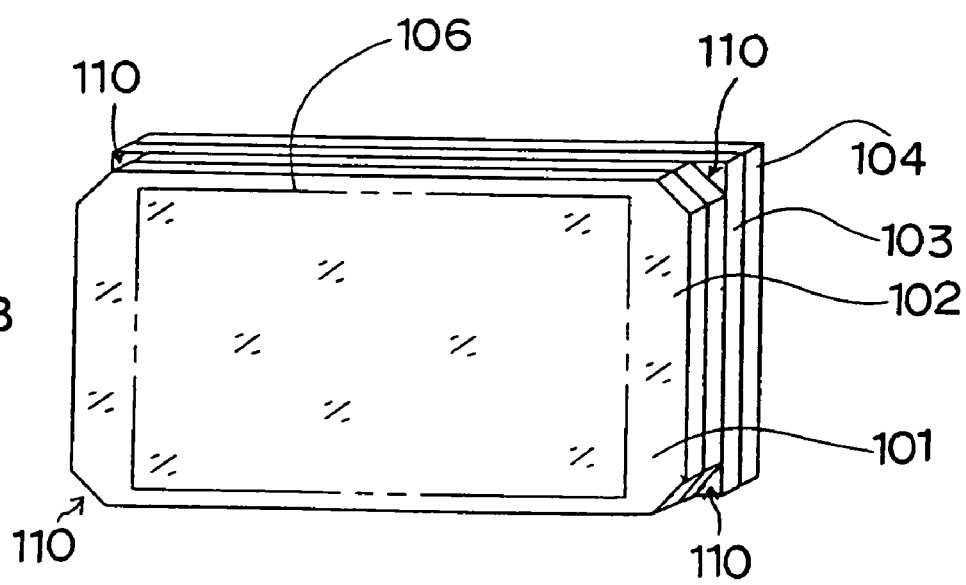

FIGS. 5A and 5B illustrate variations of the stages formed at the optical filter plate 11. In FIG. 5A, the dimensions of the birefringent plate 101 and the infrared-cutting filter plate 102 are set equal to each other in both the horizontal direction and the vertical direction, and the dimensions of the ¼λ plate 103 and the birefringent plate 104 are set equal to each other in the horizontal direction and the vertical direction. In addition the dimensions of the birefringent plate 101 and the infrared-cutting filter plate 102 along the horizontal direction and vertical direction are set slightly smaller than the corresponding dimensions of the ¼λ plate 103 and the birefringent plate 104, thereby forming a stage 109 over the entire external circumference of the optical filter plate 11.

In FIG. 5B, the birefringent plate 101, the infrared-cutting filter plate 102, the ¼λ plate 103 and the birefringent plate 104 are all formed in rectangular shapes having the same dimensions. In addition, by cutting off the four corners of both the birefringent plate 101 and the infrared-cutting filter plate 102, a stage 110 is formed at each of the four corners. The openings at the holder and the adapter are formed to match the shape of the birefringent plate 101 and the infrared-cutting filter plate 102 in FIGS. 5A and 5B.

While stages are formed by varying the sizes of the individual layers in the optical filter plate 11, the present invention is not limited to the details shown in FIGS. 2, 5A and 5B. Any of other various combinations of individual layers is included within the scope of the present invention.

Second Embodiment

Figure 6:
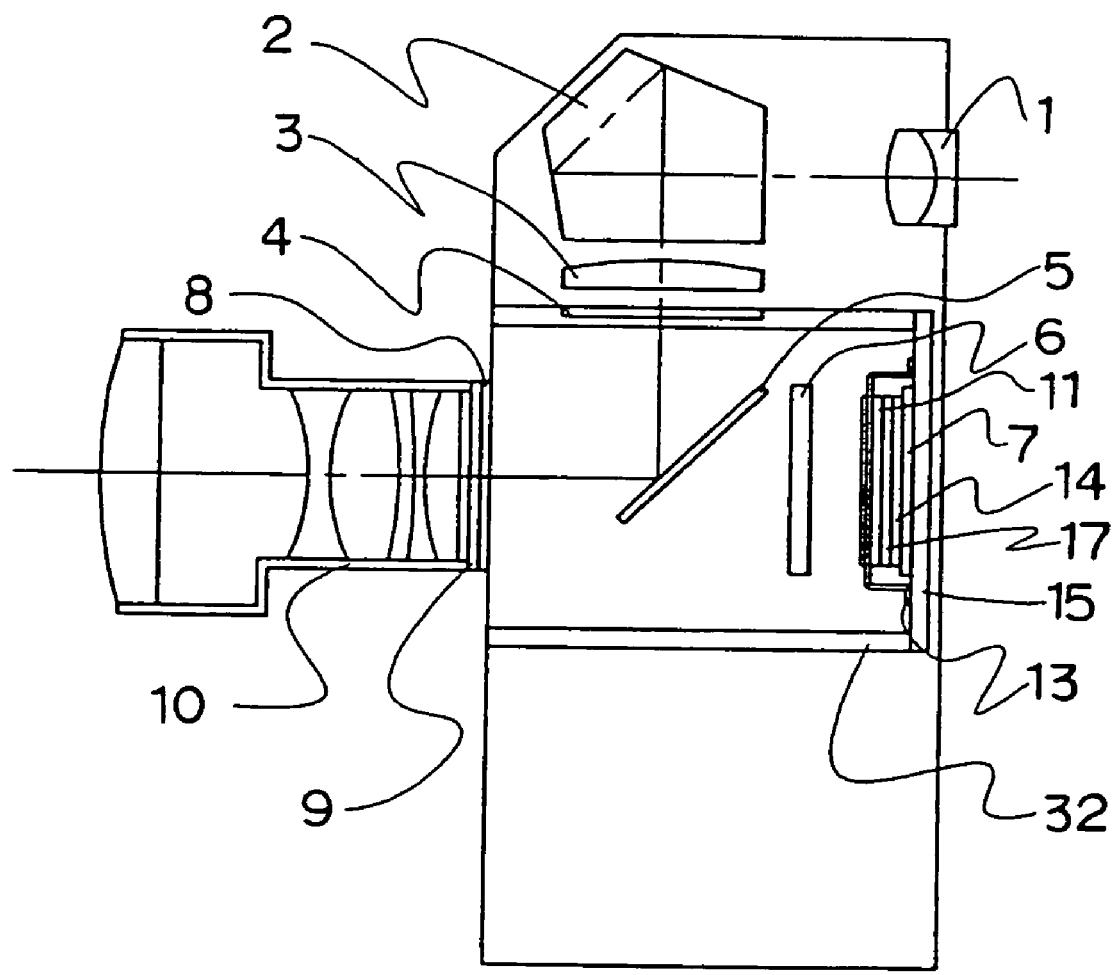
FIG. 6 illustrates the structure of a second embodiment of a digital still camera mounted with the optical filter plate (element) according to the present invention.

FIG. 6 illustrates the structure of the second embodiment of the digital still camera mounted with the optical filter plate (element) according to the present invention. This embodiment differs from the first embodiment in that it is not provided with the adapter 12. Since other structural features are identical to those in the first embodiment, their explanation is omitted and only the point concerning the absence of the adapter 12 is explained below.

Figure 7:
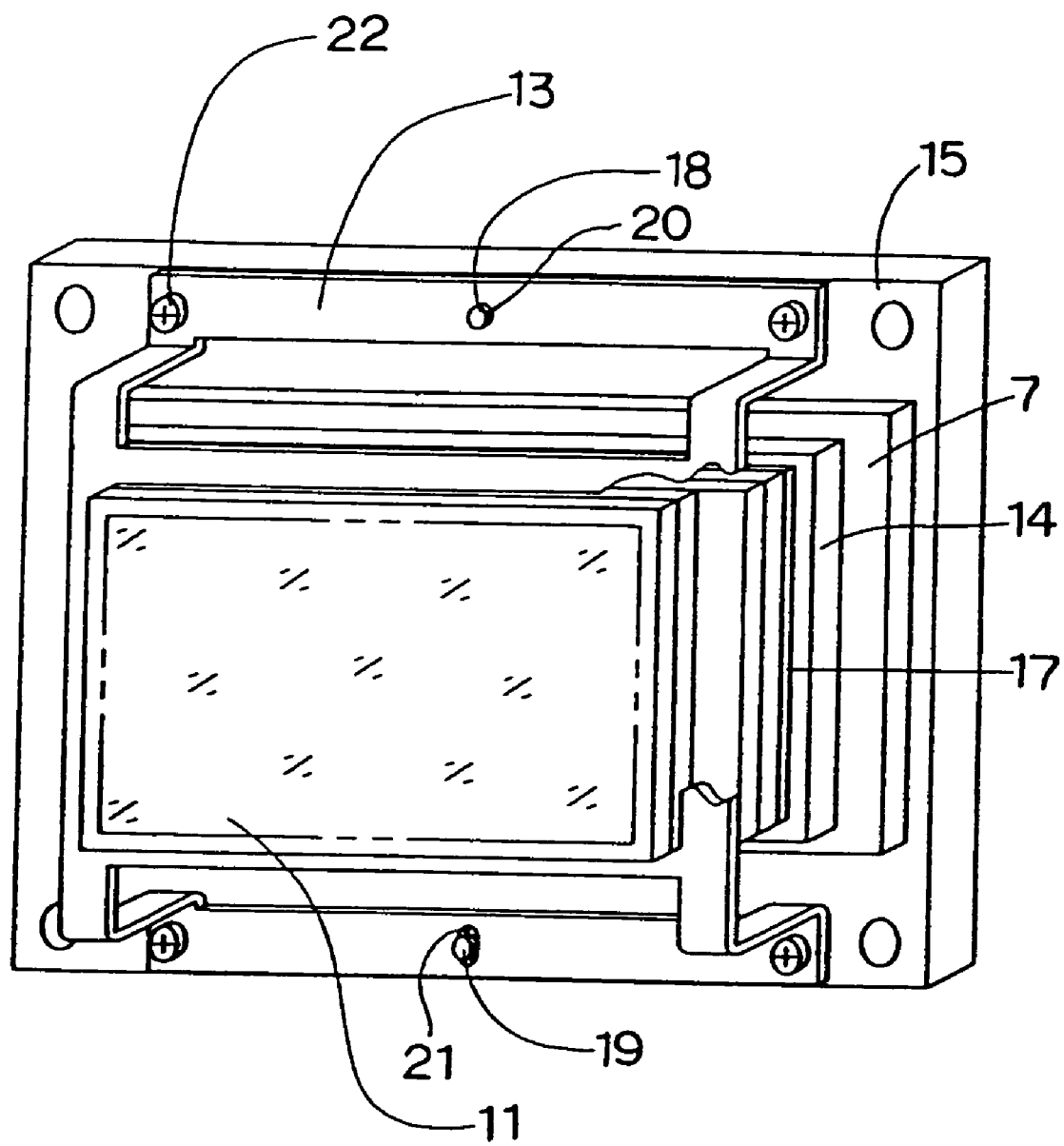
FIG. 7 illustrates how the optical filter plate is mounted in the second embodiment.

FIG. 7, which corresponds to FIG. 3 illustrating the first embodiment, illustrates how the optical filter plate 11 is mounted. The optical filter plate 11 is identical to that shown in FIG. 2. As illustrated in FIGS. 6 and 7, the second embodiment is not provided with the adapter 12 or the wall 16 that regulates the position of the adapter 12.

Namely, positioning of the optical filter plate 11 is achieved entirely by the opening portion of the holder 13, and this embodiment may be adopted when it is not crucial to achieve a high degree of accuracy in the positioning along the vertical direction in particular. In addition, the optical filter plate 11, which is pressed toward the solid image-capturing element 7 by the spring force imparted by the holder 13, does not wobble or rattle. Furthermore, by bonding the areas over which the holder 13 and the stage surface of the optical filter plate 11 come into contact with each other with glue, wobbling or rattling of the optical filter plate 11 can be prevented even more effectively.

Third Embodiment

Figure 8:
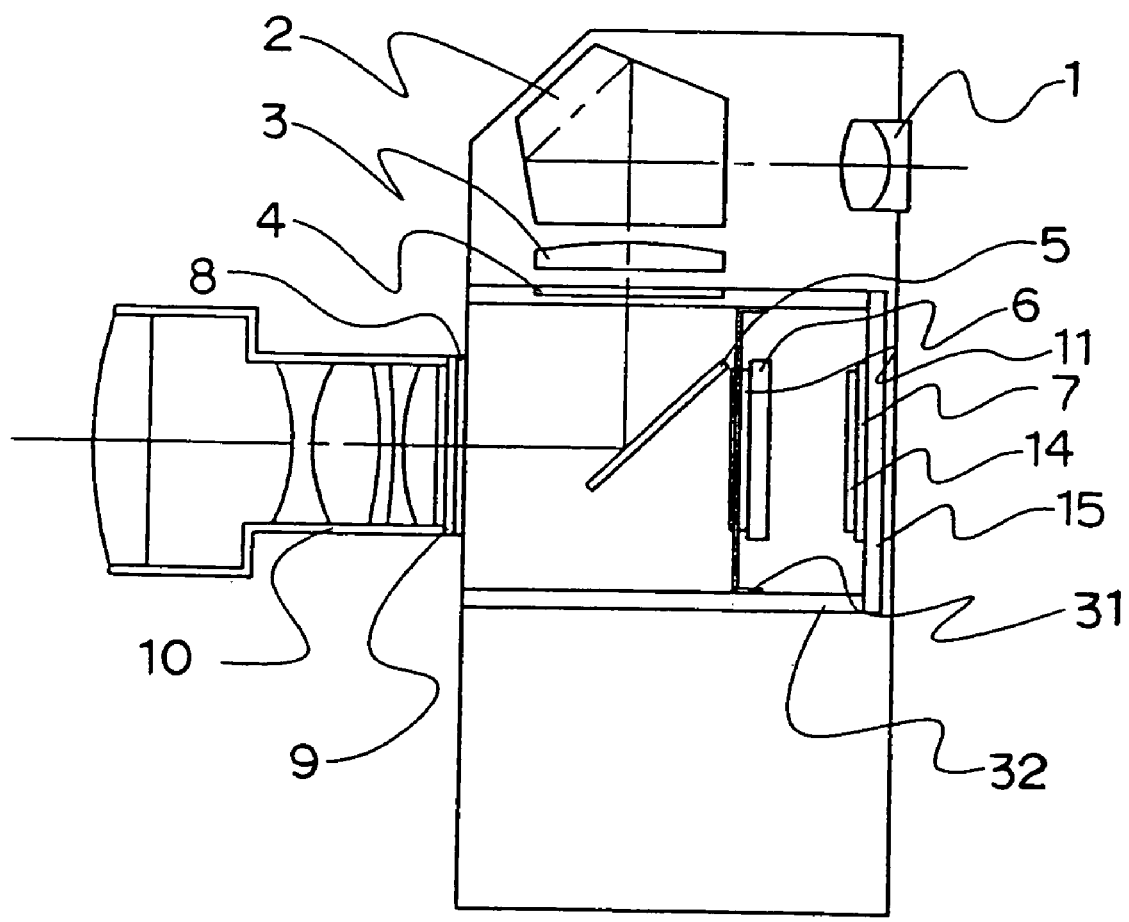
FIG. 8 illustrates the structure of a second embodiment of a digital camera mounted with the optical filter plate (element) according to the present invention.

FIG. 8 illustrates the structure of the third embodiment of a digital still camera mounted with the optical filter plate (elements) according to the present invention. While the optical filter plate 11 is provided between the shutter 6 and the solid image-capturing element 7 in the first embodiment, the optical filter plate 11 is provided between the shutter 6 and the quick-return mirror 5 in the third embodiment. Since other structural features are identical to those in the first embodiment, their explanation is omitted and the explanation below will focus on the difference.

The optical filter plate 11 is structured as illustrated in FIG. 2. The optical filter plate 11 is secured by bonding the surface of the stage perpendicular to the optical axis to the contact surface of the holder 31 with glue. The holder 31, which is secured to a frame 32 of the camera main body, is provided with an opening matching the size of the birefringent plate 101 and the infrared-cutting filter plate 102. While the dimensions of the opening are the same as those at the holder 13 in the first embodiment, the deformation attributable to the spring property of the holder 13 does not manifest in this embodiment so that the dimensional setting along the vertical direction allows for a smaller gap between the holder 31 and the optical filter plate 11.

Since the surface of the holder 31 is bonded to the surface of the stage of the optical filter plate 11 in this manner, the optical filter plate 11 is secured firmly. In addition, since it is not necessary to secure space corresponding to the plate thickness of the holder 31 in the direction of the optical axis, the optical filter plate 11 can be mounted in a small space between the shutter 6 and the quick-return mirror 5, for instance. By providing the optical filter plate 11 at such a location, a structure that facilitates cleaning of the optical filter plate 11, which can be performed by raising the quick-return mirror 5, is achieved.

While the solid image-capturing element 7 is constituted of a CCD in the first through third embodiments explained above, the present invention is not limited to this example. The present invention may be adopted in all types of image-capturing elements that need to be placed in limited space and require an optical filter plate to be provided at their front surfaces.

While the layer structure and the order in which the individual layers are combined in the optical filter plate 11 in the first-third embodiments are as illustrated in FIG. 2, the present invention is not limited to this structural example or the order in which the layers are combined. A layer achieving another function may be added or a part of layers in FIG. 2 may be omitted. For instance, the infrared-cutting filter plate 102 may be omitted to achieve a 3-layer structure. In addition, the order in which the layers are arranged may be changed freely. In other words, the present invention may be adopted in an optical filter plate achieved through any combination of filter layers.

In addition, "filter" as referred to in the context of this application is a concept that includes the instance of allowing light to pass while cutting infrared light, the instance of allowing a specific spatial frequency to pass and the instance of allowing polarized light to pass to offset the phases of linearly polarized light rays that vibrate in directions different from each other. Furthermore, the concept includes the instance of allowing light to pass while cutting uv light, the instance of allowing only visible light having a specific wavelength to pass and the instance of allowing natural light to pass while converting it to linearly polarized or circularly polarized light. In other words, the term "filter" as used in this application refers to the instance of allowing a light flux to pass while changing the characteristics or the like of the light flux. Thus, the present invention may be adopted at all types of elements achieving such a function, that are located at the front surface of a solid image-capturing element.

While the explanation is given in reference to the first through third embodiments, in which the present invention is adopted in a single lens reflex camera, it is not limited to these details. The present invention may be adopted in a camera that does not allow lens exchange. In addition, while the explanation is given above on an example in which the mechanical shutter 6 is provided, the present invention may be adopted in a camera provided only with an electronic shutter. Furthermore, while the explanation is given in reference to the embodiments in which the present invention is adopted in a still camera, it may be adopted in a video camera that handles dynamic images. In other words, the present invention may be adopted in all modes of cameras that utilize a solid image-capturing element and requires an optical filter plate to be provided at the front surface of the solid image-capturing element.

While an example in which the optical filter plate 11 is pressed and secured against the solid image-capturing element 7 is explained in reference to the first embodiment, the position of the optical filter plate 11 and the direction in which it is pressed are not restricted to the contents of the first embodiment. For instance, an optical filter plate 11 provided in the vicinity of the camera mount 8 in FIG. 1 may be pressed toward the camera mount to be secured. In addition, instead of using a glue, the optical filter plate 11 may be secured at the position assumed in the third embodiment by fitting another auxiliary holder at the stages of the optical filter plate 11 and pressing it against the holder 31.

While an example in which stages are provided at a surface on the opposite side from the surface toward the solid image-capturing element 7, i.e., on the side to which the pressing force is applied by the holder 13, is explained in reference to the first embodiment, stages may also be formed on the side on which the solid image-capturing element 7 is located. For instance, if the solid image-capturing element is provided with a frame, or if a frame or the like is provided at the mounting bracket for mounting the solid image-capturing element and the light-receiving surface of the solid image-capturing element is set slightly lower than the top surface of the frame, stages may be provided at the optical filter plate on the side on which the solid image-capturing element is located, and in this case, by fitting the frame top surface at these stages, the surface of the optical filter plate toward the solid image-capturing element can be lowered very close to the light-receiving surface of the solid image-capturing element. This, too, facilitates mounting of the optical filter plate in limited space.

What is claimed is:

1. An optical device, comprising:
    a photoelectric converter that converts a light of an image formed at a light-receiving surface of the photoelectric converter to an electric signal;
    an optical low pass filter provided at a light-receiving surface side of the photoelectric converter, and including:
        a first optical member having a first dimension along a first direction perpendicular to an optical axis, a thickness along a direction of the optical axis, and a first optical characteristic,
        a second optical member laminated onto the first optical member and having a second dimension different from the first dimension along the first direction and a second optical characteristic different from the first optical characteristic, and
        a step portion having a width defined by a difference between the first dimension of the first optical member and the second dimension of the second optical member, and a height corresponding to the thickness of the first optical member along the direction of the optical axis; and
    a holding member having a plate thickness that is thinner than the thickness of the first optical member along the direction of the optical axis, and that contacts the step portion to elastically bias the optical low pass filter in the direction of the optical axis to hold the optical low pass filter in the optical device.

2. An optical device according to claim 1, wherein:
    the first dimension of the first optical member is smaller than the second dimension of the second optical member;
    the second optical member faces the photoelectric converter; and
    the holding member presses the optical low pass filter toward the photoelectric converter to hold the optical low pass filter in the optical device.

3. An optical device according to claim 1, wherein the first optical member includes a plurality of optical layers.

4. An optical device according to claim 1, wherein:
    the first optical member includes an infrared-cutting filter, and
    the second optical member includes a ¼λ plate.

5. An optical device according to claim 1, wherein a dimension of the plate thickness of the holding member, when elastically biasing, is smaller than a dimension of the thickness of the first optical member along the direction of the optical axis.

* * * * *